(12) United States Patent
Tinsley et al.

(10) Patent No.: US 6,744,729 B2
(45) Date of Patent: Jun. 1, 2004

(54) INTELLIGENT FABRIC

(75) Inventors: David Tinsley, Campbell, CA (US); Frederick Joseph Patton, II, San Jose, CA (US)

(73) Assignee: Interactive Sapience Corp., Los Gatos, CA (US)

( * ) Notice: Subject to any disclaimer, the term of this patent is extended or adjusted under 35 U.S.C. 154(b) by 398 days.

(21) Appl. No.: 09/932,346

(22) Filed: Aug. 17, 2001

(65) Prior Publication Data

US 2003/0043815 A1 Mar. 6, 2003

(51) Int. Cl.[7] .......................... H04L 12/28; H04L 12/56
(52) U.S. Cl. ............. 370/229; 370/395.64; 370/395.21
(58) Field of Search .................. 370/254, 252, 370/389, 396, 351–356, 395.2, 395.21, 395.42, 395.43, 395.1, 395.64, 400, 401, 410, 229, 230, 235; 709/221, 220, 105

(56) References Cited

U.S. PATENT DOCUMENTS

| | | |
|---|---|---|
| 5,682,326 A | 10/1997 | Klingler |
| 5,760,767 A | 6/1998 | Shore |
| 6,006,241 A | 12/1999 | Purnaveja |
| 6,026,389 A | 2/2000 | Nakajima |
| 6,067,565 A | 5/2000 | Horvitz |
| 6,084,955 A * | 7/2000 | Key et al. ............... 379/220.01 |
| 6,119,147 A | 9/2000 | Toomey |
| 6,154,771 A | 11/2000 | Rangan |
| 6,262,730 B1 | 7/2001 | Horvitz |
| 6,301,586 B1 | 10/2001 | Yang |
| 6,314,451 B1 | 11/2001 | Landsman |
| 6,347,224 B1 * | 2/2002 | Smyth et al. ................ 455/406 |
| 6,363,411 B1 | 3/2002 | Dugan |
| 6,385,619 B1 | 5/2002 | Eichstaedt |
| 6,400,687 B1 * | 6/2002 | Davison et al. ............. 370/236 |
| 6,401,069 B1 | 6/2002 | Boys |
| 6,411,946 B1 | 6/2002 | Chaudhuri |
| 6,434,530 B1 | 8/2002 | Sloane |
| 6,466,980 B1 | 10/2002 | Lumelsky |
| 6,483,805 B1 * | 11/2002 | Davies et al. ................ 370/235 |
| 2001/0052016 A1 * | 12/2001 | Skene et al. ................. 709/226 |
| 2002/0101821 A1 * | 8/2002 | Feldmann et al. ........... 370/232 |
| 2002/0120743 A1 * | 8/2002 | Shabtay et al. ............. 709/226 |
| 2002/0194342 A1 * | 12/2002 | Lu et al. ..................... 709/227 |

* cited by examiner

*Primary Examiner*—Ajit Patel
(74) *Attorney, Agent, or Firm*—Tran & Associates

(57) ABSTRACT

An intelligent switch for routing data through a network fabric in accordance with a requested quality of service (QoS), comprising: a processor; a network interface coupled to the processor and the network fabric; and means for predicting load and redistributing traffic to deliver the data at the requested QoS.

19 Claims, 7 Drawing Sheets

| Server initializes a content database and a context database (step 300) |
|---|
| server receives and parses requests being directed at it (step 302) |
| If the request is from a compatible authoring system, the server adds or updates the received information to its content database (step 304) |
| If the request is not from the authoring system, the local server 62 determines whether it is from a user (step 306). If so, the system determines whether the user is a registered user or a new user and provides the requested content to registered users (step 308) |
| Periodically update the context database by correlating the user's usage patterns with additional external data to determine whether the user may be interested in unseen, but contextually similar information (step 310). |

FIG. 2

350 

| import content elements (step 352) |
|---|
| apply contextual descriptors to elementary streams (step 354) |
| define compositional layout (step 356) |
| content is arranged in regards to layout, sequence, and navigational flow (step 358) |
| define and associates context menus to contextual descriptors; specify hierarchical positioning of context menu entry, description, and one or more of the following end actions (local-offline, remote, and transitional (if remote is defined)) (step 360) |
| specify design-time rules for flow customization(step 362) |
| specify image destination (CD, DVD, streamed, for example) (step 364) |
| specify licensing requirements (copy protection, access control, and e-commerce), which may vary for specific content segments (step 366) |
| register as a content provider if user is not one already (step 368) |
| generate final, registered output image; registration entails updating system databases in regards to content, context, and licensing requirements (step 370). |

| user first logs-in to the server (step 401) |
| --- |
| server retrieves the user characteristics and presents a list of options that are customized to the user's tastes (step 402) |
| user can select one of the presented options, can designate an item not on the list, or can insert a new DVD (step 404) |
| user selection is updated in the context database (step 406) |
| local server retrieves information from the content to be played (step 408) |
| local server customizes the content and/or associated programs such as associated advertisements or information for the content (step 410) |
| stream content to the terminal (step 412) |
| user can view the content or can interact with the content (step 414) |
| each user operation is captured, along with the context of the operation, and the resulting data is used to update the context database for that user (step 414) |
| local server can adjust the content based on the new interaction (step 416) before looping back to step 410 to continue showing the requested content |

| user initiates playback of content (step 452) |
| --- |
| browser/player then demultiplexes any multiplexed streams (step 454) |
| parses BiFS elementary stream (step 456) |
| user fulfills licensing requirements to gain access if content is protected (step 458) |
| browser/player invokes appropriate decoders (step 460) |
| begins playback of content (step 462) |
| send contextual feedback to system (step 464) |
| system updates user preferences and feedback into the database (step 466) |
| sends new context information as available (step 468) |
| check for remote content acquisition process (step 470) |
| handle requests for remote content (step 472) |
| user responds to any interactive selections that halt playback, such as with menu |
| screens that lack a timeout and default action (step 474) |
| If live streams are paused, the system performs time-shifting if possible (step 476) |
| user may activate context menu at anytime, and make an available selection (step 478) |

| |
|---|
| user may opt to participate in public viewing session, or opt out of such a session; this is useful for point-to-point presentations, for example (step 502) |
| When opting for a public viewing session, other public users become visible, and may join into groups, resulting in synchronized sessions with one user designated as the pilot for navigation purposes (step 504) |
| When part of a group, a communication window is made available so users may discuss the content (step 506) |
| When part of a group and not the pilot, all content viewed is logged in passive mode, as the user is not responsible for interactive selections (step 508) |
| Pilot can enter a white board mode, and draw on the presentation content; these drawings are made visible to the other group members (step 510) |
| user can work in annotation mode, which is analogous to third party value-add information, in that users may leave commentary tied to particular sequences of the presentation, the visibility of such annotations may be public, or visible only to restricted access groups; an annotation window is utilized for these purposes, and is tied to the content the user is currently viewing (step 512) |
| Upon having his or her annotations commented upon, the user may elect to receive email notifications (step 514) |

FIG. 7

INTELLIGENT FABRIC

The present application is related to application Ser. No. 09/932,217, entitled "SYSTEMS AND METHODS FOR DISPLAYING A GRAPHICAL USER INTERFACE", application Ser. No. 09/932,344, entitled "SYSTEMS AND METHODS FOR AUTHORING CONTENT", and application Ser. No. 09/932,245, entitled "SYSTEMS AND METHOD FOR PRESENTING CUSTOMIZABLE MULTIMEDIA PRESENTATIONS", all of which are commonly owned and are filed concurrently herewith, the contents of which are hereby incorporated by reference.

BACKGROUND

The present invention relates to network fabrics.

The communications industry is rapidly expanding in network technologies for the broadband transmission of voice, video and data. Two such technologies are SONET, which is a high speed synchronous carrier system based on the use of optical fiber technology, and ATM which is a high speed low delay multiplexing and switching network. SONET is high speed, high capacity and suitable for large public networks, whereas ATM is applicable to a broad band integrated services digital network (BISDN) for providing convergence, multiplexing, and switching operations.

ATM uses standard size packets (cells) to carry communications signals. Each cell that is transmitted over a transmission facility includes a 5 byte header and a 48 byte payload. Since the payload is in digital form, it can represent digitized voice, digitized video, digitized facsimile, digitized data, multi-media, or any combinations of the above. The header contains information which allows each switching node along the path of an ATM communication to switch the cell to the appropriate output. The cells travel from source to destination over pre-established virtual connections. In a virtual connection, all cells from the same ingress port having the same virtual connection address will be sent to the same egress port. Once a virtual connection has been established from a Customer Premises Equipment (CPE) source to a CPE destination, all cells of the virtual connection will be sent via the same nodes to the same destination.

As discussed in U.S. Pat. No. 6,002,692, a typical switch architecture includes line interface units (LIMs), a switch fabric, and a controlle. The data path for cells traveling through an ATM network is to enter the line interface, pass through the fabric, and then exit through another line interface. For signaling and management functions, cells are removed from the outgoing stream and sent to the controller. The controller can also transmit cells through the network by passing the cells to a LIM. The cells are then transmitted through the fabric and finally transmitted out an exit line interface. Passing control through the fabric before going to the controller or leaving the switch allows multiple controllers to each monitor a small number of line interfaces with call control and network management message passed to a centralized processor when the architecture is expanded to a larger number of ports.

Connection information is contained in the ATM header and the switch cell header used internally within the switch itself. An ATM header contains a virtual path identifier (VPI) and a virtual circuit identifier (VCI) which together uniquely denote a single connection between two communicating entities. Other information, including a payload type and header error control fields, is included for use by the network in transporting the cells. The switch header contains a connection identifier to denote the connection. A portion of the connection identifier may be replaced by a sequence number as described later in this document. Additionally, the switch header contains routing information so that the cell can be routed through the switch fabric.

Due to the popularity of the Internet and applications such as video and sound content transmission, an insatiable need exists for bandwidth any time and any where. Further, due to the explosion in digital devices, a number of devices with dissimilar capability and characteristics need to be served quickly and efficiently over the fabric so that high quality presentations are achieved using minimal network resources.

SUMMARY

An intelligent switch for routing data through a network fabric in accordance with a requested quality of service (QoS), comprising: a processor; a network interface coupled to the processor and the network fabric; and means for predicting load and redistributing traffic to deliver the data at the requested QoS.

Implementations of the invention may include one or more of the following. Predictive analysis is used to configure to deliver QoS. The network fabric comprises one or more POPs and a gateway hub, wherein each POP send its current load status and QOS configuration to the gateway hub where predictive analysis is performed to handle load balancing of data streams to deliver consistent QoS for the entire network on the fly. The predicting means periodically takes snapshots of traffic and processor usage and correlates the traffic and usage data with previously archived data for usage patterns that are used to predict the configuration of the network to provide optimum QoS. The network fabric streams MPEG (Moving Picture Experts Group) elementary streams (ES), including Binary Format for Scenes (BIFS) data and Delivery Multimedia Integration Framework (DMIF) data. The BiFS data contains the DMIF data to determine the configuration of content. The DMIF and BiFS information determine the capabilities of the device accessing the channel. The data content defines the configuration of the network once its BiFS Layer is parsed and checked against the available DMIF Configuration and network status. The predicting means parses the ODs and the BiFSs to regulate elements being passed to the multiplexer. The BiFS comprises interaction rules. The rules are used to query a field in a database and wherein the field can contain scripts that execute one or more If/Then statements. The rules customize a particular object in a given scene. The network fabric includes an Asynchronous Transfer Mode (ATM) and a telephone network. Data is media content or the data represents a graphical user interface (GUI). The GUI is generated by a remote server and broadcasted to one or more devices over the fabric.

Advantages of the invention may include one or more of the following. The system combines the advantages of traditional media with the Internet in an efficient manner so as to provide text, images, sound, and video on-demand in a simple, intuitive manner.

The fabric supports the ability to communicate digital media data streams in real-time. The system is cheaper and more flexible than the prior approach to data transmission. The fabric more susceptible to incorporation within a massively parallel processing network that enhance the ability to provide real-time multi-media communications to the masses. Such a network provides a seamless, global media system which allows content creators and network owners to virtualize resources. Rather than restrictively accessing only the memory space and processing time of a local resource, the system allows access to resources throughout the network. In small access points such as wireless devices, where very little memory and processing logic is available due to limited battery life, the system is able to customize delivery so that judicious bandwidth consumption is achieved while providing a high quality presentation given particular device hardware characteristics.

The invention also support deployment of new application software and services by broadcasting data across the network rather than by instituting costly hardware upgrades across the whole network. Broadcasting software across the network can be performed at the end of an advertisement or other program that is broadcasted nationally. Thus, services can be advertised and then transmitted to new subscribers at the end of the advertisement.

Other advantages and features will become apparent from the following description, including the drawings and claims.

BRIEF DESCRIPTION OF THE DRAWINGS

FIG. 2 shows an exemplary operation for a local server.

FIG. 3 shows an exemplary authoring process.

FIG. 4 shows an exemplary process running on a viewing terminal.

FIG. 5 illustrates a process relating to content consumption within a browser/player.

FIG. 7 shows a process to enhance for user community participation.

DESCRIPTION

Figure 1:
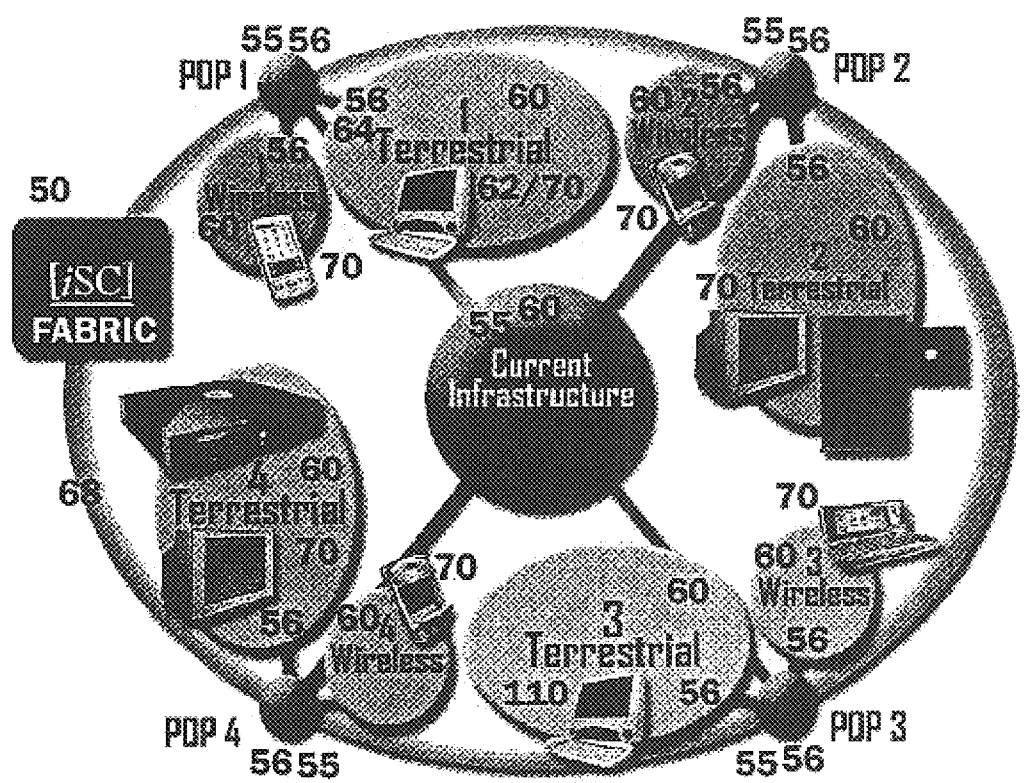
FIG. 1 shows one embodiment of a FABRIC for supporting customizable presentations.

Referring now to the drawings in greater detail, there is illustrated therein structure diagrams for the customizable content transmission system and logic flow diagrams for the processes a computer system will utilize to complete various content requests or transactions. It will be understood that the program is run on a computer that is capable of communication with consumers via a network, as will be more readily understood from a study of the diagrams.

FIG. 1 shows an exemplary network. The system also stores content, serves content and streams the content, as modified in real-time by the context, to a user on-demand. The system includes a switching FABRIC 50 connecting a plurality of networks 60. The switching FABRIC 50 provides an interconnection architecture which uses multiple stages of switches 56 to route transactions between a source address and a destination address of a data communications network. The switching FABRIC 50 includes multiple switching devices and is scalable because each of the switching devices of the FABRIC 50 includes a plurality of network ports and the number of switching devices of the FABRIC 50 may be increased to increase the number of network 60 connections for the switch. The FABRIC 50 includes all networks, which subscribe and are connected to each other and includes wireless networks, cable television networks, WAN's such as Exodus, Quest, DBN.

Computers 62 are connected to a network hub 64 that is connected to a switch 56, which can be an Asynchronous Transfer Mode (ATM) switch, for example. Network hub 64 functions to interface an ATM network to a non-ATM network, such as an Ethernet LAN, for example. Computer 62 is also directly connected to ATM switch 56. Multiple ATM switches are connected to WAN 68. The WAN 68 can communicate with FABRIC, which is the sum of all associated networks. FABRIC is the combination of hardware and software that moves data coming in to a network node out by the correct port (door) to the next node in the network.

Connected to the regional networks 60 can be viewing terminals 70. One or more regional servers 55 (RUE) processes transactions with the terminals 70 or computers 62 connected to its designated network. Each server 55 (RUE) includes a content database that can be customized and streamed on-demand to the user. Its central repository stores information about content assets, content pages, content structure, links, and user profiles, for example. Each regional server 55 (RUE) also captures usage information for each user, and based on data gathered over a period, can predict user interests based on historical usage information. Based on the predicted user interests and the content stored in the server, the server can customize the content to the user interest. The regional server 55 (RUE) can be a scalable compute farm to handle increases in processing load. After customizing content, the regional server 55 (RUE) communicates the customized content to the requesting viewing terminal 70.

The viewing terminals 70 can be a personal computer (PC), a television (TV) connected to a set-top box, a TV connected to a DVD player, a PC-TV, a wireless handheld computer or a cellular telephone. However, the system is not limited to any particular hardware configuration and will have increased utility as new combinations of computers, storage media, wireless transceivers and television systems are developed. In the following any of the above will sometimes be referred to as a "viewing terminal". The program to be displayed may be transmitted as an analog signal, for example according to the NTSC standard utilized in the United States, or as a digital signal modulated onto an analog carrier, or as a digital stream sent over the Internet, or digital data stored on a DVD. The signals may be received over the Internet, cable, or wireless transmission such as TV, satellite or cellular transmissions.

In one embodiment, a viewing terminal 70 includes a processor that may be used solely to run a browser GUI and associated software, or the processor may be configured to run other applications, such as word processing, graphics, or the like. The viewing terminal's display can be used as both a television screen and a computer monitor. The terminal will include a number of input devices, such as a keyboard, a mouse and a remote control device, similar to the one described above. However, these input devices may be combined into a single device that inputs commands with keys, a trackball, pointing device, scrolling mechanism, voice activation or a combination thereof.

The terminal 70 can include a DVD player that is adapted to receive an enhanced DVD that, in combination with the regional server 55 (RUE), provides a custom rendering based on the content 2 and context 3. Desired content can be stored on a disc such as DVD and can be accessed, downloaded, and/or automatically upgraded, for example, via downloading from a satellite, transmission through the internet or other on-line service, or transmission through another land line such as coax cable, telephone line, optical fiber, or wireless technology.

An input device can be used to control the terminal and can be a remote control, keyboard, mouse, a voice activated interface or the like. The terminal may include a video capture mechanism such as a capture card connected to either live video, baseband video, or cable. The video capture card digitizes a video image and displays the video image in a window on the monitor. The terminal is also connected to a regional server 55 (RUE) over the Internet using various mechanisms. This can be a 56K modem, a cable modem, Wireless Connection or a DSL modem. Through this connection, the user connects to a suitable Internet service provider (ISP), which in turn is connected to the backbone of the network 68 such as the Internet, typically via a T1 or a T3 line. The ISP communicates with the viewing terminals 70 using a protocol such as point to point protocol (PPP) or a serial line Internet protocol (SLIP) 100 over one or more media or telephone network, including landline, wireless line, or a combination thereof. On the terminal side, a similar PPP or SLIP layer is provided to communicate with the ISP. Further, a PPP or SLIP client layer communicates with the PPP or SLIP layer. Finally, a network aware GUI (VUI) receives and formats the data received over the Internet in a manner suitable for the user. As discussed in more detail below, the computers communicate using the functionality provided by MPEG 4 Protocol (ISO 14496). The World Wide Web (WWW) or simply the "Web" includes all the servers adhering to standard IP protocol. For example, communication can be provided over a communication medium. In some embodiments, the client and server may be coupled via Serial Line Internet Protocol (SLIP) or TCP/IP connections for high-capacity communication.

Active within the viewing terminal is a user interface (VUI) that establishes the connection with the server 55 and allows the user to access information. In one embodiment, the user interface (VUI) is a GUI that supports Moving Picture Experts Group-4 (MPEG-4), a standard used for coding audio-visual information (e.g., movies, video, music) in a digital compressed format. The major advantage of MPEG compared to other video and audio coding formats is that MPEG files are much smaller for the same quality using high quality compression techniques. In another embodiment, the GUI (VUI) can be on top of an operating system such as the Java operating system. More details on the GUI are disclosed in the copending application entitled "SYSTEMS AND METHODS FOR DISPLAYING A GRAPHICAL USER INTERFACE", the content of which is incorporated by reference.

In another embodiment, the terminal 70 is an intelligent entertainment unit that plays DVD. The terminal 70 monitors usage pattern entered through the browser and updates the regional server 55 (RUE) with user context data. In response, the regional server 55 (RUE) can modify one or more objects stored on the DVD, and the updated or new objects can be downloaded from a satellite, transmitted through the internet or other on-line service, or transmitted through another land line such as coax cable, telephone line, optical fiber, or wireless technology back to the terminal. The terminal 70 in turn renders the new or updated object along with the other objects on the DVD to provide on-the-fly customization of a desired user view.

The system handles MPEG (Moving Picture Experts Group) streams between a server and one or more terminals using the switches. The server broadcasts channels or addresses which contain streams. These channels can be accessed by a terminal, which is a member of a WAN, using IP protocol. The switch, which sits at the gateway for a given WAN, allocates bandwidth to receive the channel requested. The initial Channel contains BiFS Layer Information, which the Switch can parse, process DMIF to determine the hardware profile for its network and determine the addresses for the AVO's needed to complete the defined presentation. The Switch passes the AVO's and the BiFS Layer information to a Multiplexor for final compilation prior to broadcast on to the WAN.

As specified by the MPEG-4 standard, the data streams (elementary streams, ES) that result from the coding process can be transmitted or stored separately, and need only to be composed so as to create the actual multimedia presentation at the receiver side. In MPEG-4, relationships between the audio-visual components that constitute a scene are described at two main levels. The Binary Format for Scenes (BIFS) describes the spatio-temporal arrangements of the objects in the scene. Viewers may have the possibility of interacting with the objects, e.g. by rearranging them on the scene or by changing their own point of view in a 3D virtual environment. The scene description provides a rich set of nodes for 2-D and 3-D composition operators and graphics primitives. At a lower level, Object Descriptors (ODs) define the relationship between the Elementary Streams pertinent to each object (e.g the audio and the video stream of a participant to a videoconference) ODs also provide additional information such as the URL needed to access the Elementary Steams, the characteristics of the decoders needed to parse them, intellectual property and others.

Media objects may need streaming data, which is conveyed in one or more elementary streams. An object descriptor identifies all streams associated to one media object. This allows handling hierarchically encoded data as well as the association of meta-information about the content (called 'object content information') and the intellectual property rights associated with it. Each stream itself is characterized by a set of descriptors for configuration information, e.g., to determine the required decoder resources and the precision of encoded timing information. Furthermore the descriptors may carry hints to the Quality of Service (QOS) it requests for transmission (e.g., maximum bit rate, bit error rate, priority, etc.) Synchronization of elementary streams is achieved through time stamping of individual access units within elementary streams. The synchronization layer manages the identification of such access units and the time stamping. Independent of the media type, this layer allows identification of the type of access unit (e.g., video or audio frames, scene description commands) in elementary streams, recovery of the media object's or scene description's time base, and it enables synchronization among them. The syntax of this layer is configurable in a large number of ways, allowing use in a broad spectrum of systems.

The synchronized delivery of streaming information from source to destination, exploiting different QoS as available from the network, is specified in terms of the synchronization layer and a delivery layer containing a two-layer multiplexer. The first multiplexing layer is managed according to the DMIF specification, part 6 of the MPEG-4 standard. (DMIF stands for Delivery Multimedia Integration Framework) This multiplex may be embodied by the MPEG-defined FlexMux tool, which allows grouping of Elementary Streams (ESs) with a low multiplexing overhead. Multiplexing at this layer may be used, for example, to group ES with similar QoS requirements, reduce the number of network connections or the end to end delay. The "TransMux" (Transport Multiplexing) layer models the layer that offers transport services matching the requested QoS.

Content can be broadcast allowing a system to access a channel, which contains the raw BiFS Layer. The BiFS Layer contains the necessary DMIF information needed to determine the configuration of the content. This can be looked at as a series of criteria filters, which address the relationships defined in the BiFS Layer for AVO relationships and priority.

DMIF and BiFS determine the capabilities of the device accessing the channel where the application resides, which can then determine the distribution of processing power between the server and the terminal device. Intelligence, built in to the FABRIC, will allow the entire network to utilize predictive analysis to configure itself to deliver QOS.

The switch 16 can monitor data flow to ensure no corruption happens. The switch also parses the ODs and the BiFSs to regulate which elements it passes to the multiplexer and which it does not. This will be determined based on the type of network the switch sits as a gate to and the DMIF information. This "Content Conformation" by the switch happens at gateways to a given WAN such as a Nokia 144 k 3-G Wireless Network. These gateways send the multiplexed data to switches at its respective POP's where the database is installed for customized content interaction and "Rules Driven" Function Execution during broadcast of the content.

When content is authored, the BiFS can contain interaction rules that query a field in a database. The field can contain scripts that execute a series of "Rules Driven" (If/Then Statements), for example: If user "X" fits "Profile A" then access Channel 223 for AVO 4. This rules driven system can customize a particular object, for instance, customizing a generic can to reflect a Coke can, in a given scene.

Each POP send its current load status and QOS configuration to the gateway hub where Predictive Analysis is performed to handle load balancing of data streams and processor assignment to deliver consistent QOS for the entire network on the fly. The result is that content defines the configuration of the network once its BiFS Layer is parsed and checked against the available DMIF Configuration and network status. The switch also periodically takes snapshots of traffic and processor usage. The information is archived and the latest information is correlated with previously archived data for usage patterns that are used to predict the configuration of the network to provide optimum QOS. Thus, the network is constantly re-configuring itself The content on the FABRIC can be categorized in to two high level groups:

1. A/V (Audio and Video): Programs can be created which contain AVO's (Audio Video Objects), their relationships and behaviors (Defined in the BiFS Layer) as well as DMIF (Distributed Multimedia Interface Framework) for optimization of the content on various platforms. Content can be broadcast in an "Unmultiplexed" fashion by allowing the GLUI to access a channel which contains the Raw BiFS Layer. The BiFS Layer will contain the necessary DMIF information needed to determine the configuration of the content. This can be looked at as a series of criteria filters, which address the relationships defined in the BiFS Layer for AVO relationships and priority. In one exemplary application, a person using a connected wireless PDA, on a 3-G WAN, can request access to a given channel, for instance channel 345. The request transmits from the PDA over the wireless network and channel 345 is accessed. Channel 345 contains BiFS Layer information regarding a specific show. Within the BiFS Layer is the DMIF information, which says . . . If this content is being played on a PDA with access speed of 144 k then access AVO 1, 3, 6, 13 and 22. The channels where these AVO's may be defined can be contained in the BiFS Layer of can be extensible by having the BiFS layer access a field on a related RRUE database which supports the content. This will allow for the elements of a program to be modified over time. A practical example of this systems application is as follows: a broadcaster transmitting content with a generic bottle can receive advertisement money from Coke another from Pepsi. The Actual label on the bottle will represent the advertiser when a viewer from a given area watches the content. The database can contain and command rules for far more complex behavior. If/Then Statements relative to the users profile and interaction with the content can produce customized experiences for each individual viewer on the fly.

2. Applications (ASP): Applications running on FABRIC represent the other type of Content. These applications can be developed to run on the servers and broadcast their interface to the GLUI of the connected devices. The impact of FABRIC and VUI enables $3^{rd}$ party developers to write an application such as a word processor that can send its interface, in for example, compressed JPEG format to the end users terminal device such as a wireless connected PDA.

An exemplary viewing customization is discussed next. In the context of the MPEG specification, an elementary stream (ES) is a consecutive flow of mono-media from a single source entity to a single destination entity on the compression layer. An access unit (AU) is an individually accessible portion of data within an ES and is the smallest data entity to which timing information can be attributed. A presentation consists of a number of elementary streams representing audio, video, text, graphics, program controls and associated logic, composition information (i.e. Binary Format for Scenes), and purely descriptive data in which the application conveys presentation context descriptors (PCDs). If multiplexed, streams are demultiplexed before being passed to a decoder. Additional streams noted below are for purposes of perspective (multi-angle) for video, or language for audio and text. The following table shows each ES broken by access unit, decoded, then prepared for composition or transmission.

| | AUn | AU2 | AU1 | Decoder | Action |
|---|---|---|---|---|---|
| content | | | | | |
| elementary streams | An→ | A2→ | A1→ | video decode | scene composition |
| video base layer | An→ | A2→ | A1→ | video decode | scene composition |
| video enhancement layers | An→ | A2→ | A1→ | video decode | scene composition |
| additional video base layers | An→ | A2→ | A1→ | video decode | scene composition |
| additional video enhancement layers | An→ | A2→ | A1→ | video decode | scene composition |
| audio | An→ | A2→ | A1→ | audio decode | scene composition |
| additional audio | An→ | A2→ | A1→ | audio decode | scene composition |
| text overlay | An→ | A2→ | A1→ | text decode | scene composition |
| additional text overlays | An→ | A2→ | A1→ | text decode | scene composition |
| BiFS | An→ | A2→ | A1→ | BiFS parse | scene composition |

|  | AUn | AU2 | AU1 | Decoder | Action |
|---|---|---|---|---|---|
| context |  |  |  |  |  |
| presentation context stream(s) | An→ | A2→ | A1→ | PCD parse | data transmission & context menu composition |

In this exemplary interactive presentation, a timeline indicates the progression of the scene. The content streams render the presentation proper, while presentation context descriptors reside in companion streams. Each descriptor indicates start and end time code. Pieces of context may freely overlap. As the scene plays: the current content streams are rendered, and the current context is transmitted over the network to the system. The presentation context is attributed to a particular ES, and each ES may or may not have contextual description. Presentation context of different ESs may reside in the same stream or different streams. Each presentation descriptor has a start and end flag, with a zero for both indicating a point in between. Whether or not descriptor information is repeated in each access unit corresponds to the random access characteristics of the associated content stream. For instance, predictive and bi-directional frames of MPEG video are not randomly accessible as they depend upon frames outside themselves. Therefore, in such cases, PCD info need not be repeated in such instances.

During the parsing stage of presentation context, it is determined whether the PCD is absolute, that is, its context is always active when its temporal definition is valid, or conditional, in which case it is only active upon user selection. In the latter case, the PCD refers to presentation content (not context) to jump to, enabling contextual navigation. The conditional context may also be regarded as interactive context. These PCDs include contextual information to display to the user within a context menu, which may involve alternate language translations.

Next, the presentation of a scene is discussed. The presentation involves the details of the scene, namely, who and what is in the scene, as well as what is happening. All of these elements contribute to the context of the scene. In the first case, items and characters in the scene, may have contextual relevance throughout their scene presence. In regards to what is happening, the relevant context tends to mirror the timeline of the activity in question.

Absolute context will just indicate a particular scene or segment has been reached to the system. This information can be used to funnel additional information outside of the main presentation, such as advertisements.

Interactive context is triggered by the user, unlike traditional menus. Interactive context provides a means for the user to access contextually related information via a context menu. A PCD will indicate what text and text properties to present to a user, as well as the hierarchical location within the menu. For instance, a scene with Robert DeNiro and Al Pacino meeting in a cafe, could specify contextual nodes related to DeNiro shown below. The bracketing depicts the positioning within the menu. Then end-actions, similar to the HREFs of HTML, have been omitted, but conform to the following format: <localStreamID="" remoteStreamID="" transitionStreamID="">, which specifies where the content can be found, and depending on the connection type. For instance, content with no local streamID, would be grayed out or omitted, depending on the GUI preference, if no Internet connection was active. A transitional stream is a local placeholder used to increased perceived reponsiveness, and provides feedback in regards to stream acquisition.

<Actors><Robert DeNiro><list of credits>
<Actors><Robert DeNiro><interviews><with DeNiro about this movie>
<Actors><Robert DeNiro><interviews><on DeNiro in this movie>
<Actors><Robert DeNiro><interviews><other interviews with DeNiro>
<Actors><Robert DeNiro><interviews><other interviews on DeNiro>
<Actors><Robert DeNiro><tidbits>

The bracketing depicts the positioning within the menu. Then end-actions, similar to the HREFs of HTML, have been omitted, but conform to the following format: <localStreamID="" remoteStreamID="" transitionStreamID="">, which specifies where the content can be found (not mutually exclusive), and depending on the connection type. For instance, content with no local streamID, would be grayed out or omitted, depending on the GUI preference, if no Internet connection was active. A transitional stream is a local placeholder used to increased perceived responsiveness, and provides feedback in regards to stream acquisition. It's a great opportunity for advertisements.

It's up to the author or information provider to decide how to structure context menus. Information in regards to background music, location, set props, and objects corresponding to brand names, such as clothing, could provide contextual information. Because the context will vary over the time, the addition of new interactive context is likely to be an ongoing process. Because the GUI is constantly providing feedback during online sessions, the system can pass new context in one or more additional presentation context streams.

People watch movies for various reasons and with various things in mind. Value-add subscriber services could cater to special interests such as those listed below.

movie buffs
entertainment (what the stars are up to)
cinemaphotography
backstage pass
fashion All a presentation context descriptor does is define a region of content in regards to an elementary stream, and, optionally, define a context menu item positioned within an associated hierarchy. It functions like, and corresponds to, a database, key. As a descriptor is just a place holder, it is the use of semantic descriptors which generate meaning: that is, how the segment relates to other segments, and to the user, and by an extension, how a user relates to other users.

Semantic descriptors operate with context descriptors to create a collection of weighted attributes. Weighted attributes are applied to content segments, user histories, and advertisements, yielding a weight-based system for intelligent marketing. In one embodiment, the logic of rules-based data agents then comes down to structured query language. A semantic descriptor is itself no more than an identifier, a label, and a definition, which is enough to introduce categorization. Its power comes from its inter-relationship with other semantic descriptors. Take the following descriptors: playful, silly, funny, flirtatious, sexy, predatorial, and mischievous. The component "playful" can show up in very different contexts, such as humor ("silly", "funny"), sexuality ("flirtatious", "sexy"), and hunting/torture (think animals with their prey, the Penguin or Joker with the Dynamic Duo in their clutches, or all those villains who always get foiled because of their excessive playfulness. Now, while these different applications are very different, take someone who exhibits an appeal toward this very distinct trait of playfulness. Without this depth, to just say the user enjoys humor, sex, wildlife shows, and sexual suggestiveness, would be to miss the point, not to mention leading to some off-based recommendations.

Because the system stores what is watched by a particular installation (whether explicit selections or passive viewing) when and how often, along with the granularity of small segments, over time, the system takes note of what components are prevalent. Logging of activity is independent from the semantic modeling of the content, so that the current model is valid for time periods before it. This means that changes to the model can trigger corrections that must be processed in non-real-time. The relationship between descriptors flows from specific to general, for instance, flirtatiousness is a type of playfulness, so the semantics flow from flirtatious to playful, such that something flirtatious is also to be considered playful. Being silly can often be playful but not necessarily. There are different types of foolishness and silliness that should be clarified, such that one particular meaning of a word is meant in regards to a granular descriptor. Thus, a number after the label would indicate which one meaning of a term was meant. Being mischievous generally has a component of playfulness, but in regards to hunting and villainous capture, "playful" would be coincidental as opposed integral. The general strategy, however, is to locate the most granular descriptors and accumulate them into more refined meaning. Over time, the system is refined such that fine-tuning won't come initially, but even with little data, the system can distinguish various genres such as thrillers and sports.

A presentation context descriptor and a semantic descriptor are associated via a semantic presentation map tying the two descriptors and a relative weight. This adds a good degree of flexibility in scoring the prominence of attributes within content. It is up to a particular database agent to express the particular formula involved.

Referring back to the <actor> example, there might be three different advertisements. The system employs some degree of variance regardless of the profile in question, but all things considered equal, the best match in advertising will generally stem from an attribute-based correlation of the profile history at the installation, the current content being viewed, and the advertisements being considered, and some scoring criterion. Also, the system via contextual feedback, can anticipate in advance the need to perform the correlation. As a result, the system can anticipate and customize content when the user requests a particular action on the user interface.

FIG. 2 shows an exemplary operation for the local server 62. First, the server 62 initializes a content database and a context database (step 300). Next, the server receives and parses requests being directed at it (step 302). If the request is from a compatible authoring system, the server adds or updates the received information to its content database (step 304). The content database provides a fine-grained categorization of one or more scenes in a particular movie, corporate presentation, video program, or multimedia content. Based on the categorization, context information could be applied. For example, a movie can have a hundred scenes. A content creator, such as a movie editor, would use the authoring system to annotate each scene using a predetermined format, for example an XML compatible format. The annotation tells the local server 62 the type of scene, the actor/actress involved, a list of objects that can be customized, and definitions so that the local server can retrieve and modify the objects. After all scenes have been annotated, the authoring system uploads the information to the local server 62.

From step 304, if the request is not from the authoring system, the local server 62 determines whether it is from a user (step 306). If so, the system determines whether the user is a registered user or a new user and provides the requested content to registered users. The local server 62 can send the default content, or can interactively generate alternate content by selecting a different viewing angle or generate more information on a particular scene or actor/actress, for example. The local server 62 receives in real-time actions taken by the user, and over time, the behavior of a particular user can be predicted based on the context database. For example, as the user is browsing through the programs, he or she may wish to obtain more information relating to specific areas of interest or concerns associated with the show, such as the actors, actresses, other movies released during the same time period, or travel packages or promotions that may be available through primary, secondary or third party vendors. The captured context is stored in the context database and used to customize information to the viewer even with the multitude of programs broadcast every day. In addition, the system can rapidly update and provide the available information to viewers in real time. After servicing the user, the process loops back to step 302 to handle the next request.

From step 302, periodically, the system updates the context database by correlating the user's usage patterns with additional external data to determine whether the user may be interested in unseen, but contextually similar information (step 310). This is done by data-mining the context database.

In one implementation, the server 62 finds groupings (clusters) in the data. Each cluster includes records that are more similar to members of the same cluster than they are similar to rest of the data. For example, in a marketing application, a company may want to decide who to target for an ad campaign based on historical data about a set of customers and how they responded to previous campaigns. Clustering techniques provide an automated process for analyzing the records of the collection and identifying clusters of records that have similar attributes. For example, the server can cluster the records into a predetermined number of clusters by identifying records that are most similar and place them into their respective cluster. Once the categories (e.g., classes and clusters) are established, the local server 62 can use the attributes of the categories to guide decisions. For example, if one category represents users who are mostly teenagers, then a web master may decide to include advertisements directed to teenagers in the web pages that are accessed by users in this category. However, the local server 62 may not want to include advertisements directed to teenagers on a certain presentation if users in a different category who are senior citizens also happen to access that presentation frequently. Each view can be customized to a particular user, so there are not static view configurations to worry about. Users can see the same content, but different advertisements.

In another implementation, a Naive-Bayes classifier can be used to perform the data mining. The Naive-Bayes classifier uses Bayes rule to compute the probability of each class given an instance, assuming attributes are conditionally independent given a label. The Naive-Bayes classifier requires estimation of the conditional probabilities for each attribute value given the label. For discrete data, because only few parameters need to be estimated, the estimates tend to stabilize quickly and more data does not change the model much. With continuous attributes, discretization is likely to form more intervals as more data is available, thus increasing the representation power. However, even with continuous data, the discretization is usually global and cannot take into account attribute interactions. Generally, Naive-Bayes classifiers are preferred when there are many irrelevant features. The Naive-Bayes classifiers are robust to irrelevant attributes and classification takes into account evidence from many attributes to make the final prediction, a property that is useful in many cases where there is no "main effect." Also, the Naive-Bayes classifiers are optimal when the assumption that attributes are conditionally independent hold, e.g., in medical practice. On the downside, the Naive-Bayes classifiers require making strong independence assumptions. When these assumptions are violated, the achievable accuracy may asymptote early and will not improve much as the database size increases.

Other data-mining techniques can be used. For example, a Decision-Tree classifier can be used. This classifier assigns each record to a class, and the Decision-Tree classifier is induced (generated) automatically from data. The data, which is made up of records and a label associated with each record, is called the training set. Decision-Trees are commonly built by recursive partitioning. A univariate (single attribute) split is chosen for the root of the tree using some criterion (e.g., mutual information, gain-ratio, gini index). The data is then divided according to the test, and the process repeats recursively for each child. After a full tree is built, a pruning step is executed which reduces the tree size. Generally, Decision-Trees are preferred where serial tasks are involved, i.e., once the value of a key feature is known, dependencies and distributions change. Also, Decision-Trees are preferred where segmenting data into sub-populations gives easier subproblems. Also, Decision-Trees are preferred where there are key features, i.e., some features are more important than others.

In yet another implementation, a hybrid classifier, called the NB-Tree hybrid classifier, is generated for classifying a set of records. As discussed in U.S. Pat. No. 6,182,058, each record has a plurality of attributes. According to the present invention, the NB-Tree classifier includes a Decision-Tree structure having zero or more decision-nodes and one or more leafnodes. At each decision-node, a test is performed based on one or more attributes. At each leaf-node, a classifier based on Bayes Rule classifies the records.

The result of the data-mining operation is used to update the context database so that the next time the user views information, the local server 62 can automatically customize the content exactly to the user's wishes.

Referring now to FIG. 3, a process 350 for authoring content and registering the new content with the local server 62 is shown. The process 350 is executed by the Authoring System at Design Time. First, a user imports content elements (step 352). Next, the user applies contextual descriptors to elementary streams: MPEG-7 layer information, for example (step 354). The user can also define compositional layout, such as multiple windows or event specific popups and certain content meant to be displayed in a windowed presentation can make use of the popups, for example (step 356). The content is arranged in regards to layout, sequence, and navigational flow (step 358). In this step, the user can also specify navigational interactivity; examples of navigational interactivity are: anchors (clickable targets), forms, alternate tracks and context menus, virtual presence (VRML-like navigation), and interactive stop mode, where playback breaks periodically pending user interaction, which determines flow control. The user then defines and associates context menus to contextual descriptors; specify hierarchical positioning of context menu entry, description, and one or more of the following end actions (local-offline, remote, and transitional (if remote is defined)) (step 360). The user can specify design-time rules for flow customization(step 362). Next, the user can specify image destination (CD, DVD, streamed, for example) (step 364). The user can also specify licensing requirements (copy protection, access control, and e-commerce), which may vary for specific content segments (step 366). The user then registers as a content provider if he or she is not one already (step 368). Additionally, the user can generate final, registered output image; registration entails updating system databases in regards to content, context, and licensing requirements (step 370).

Using the above steps, the user imports components or assets into a particular project and edits the assets and annotates the assets with information that can be used to customize the presentation of the resulting content. The authoring system can also associate URLs with chapter points in movies and buttons in menus. A timeline layout for video is provided which supports the kind of assemble editing users expect from NLE systems. Multiple video clips can simply be dropped or rearranged on the timeline. Heads and Tails of clips can be trimmed and the resulting output is MPEG compliant. The user can also generate active button menus over movies using subpictures and active button hotspots on movies for interactive and training titles.

The above steps to author contextually-dependent, value-add content are the same as with initial content authoring, except that instead of, or in addition to, arranging content flow, contextual triggers are defined to make available the various contextual segments; primary linkage, then, depends upon external content.

Turning now to FIG. 4, a process 400 running on the local terminal 70 is shown. The user first logs-in to the server (step 401). The server retrieves the user characteristics and presents a list of options that are customized to the user's tastes (step 402). The options can include a custom list of movies, sport programs, financial presentations, among others, that the user has viewed in the past or is likely to watch. The user can select one of the presented options, can designate an item not on the list, or can insert a new DVD (step 404). The user selection is updated in the context database (step 406) and the local server 62 retrieves information from the content to be played (step 408). For example, if the user has inserted a new DVD, the local server 62 identifies the DVD and search in its content database for customizable objects and information relating to the content. Based on the content database, the local server customizes the content and/or associated programs such as associated advertisements or information for the content (step 410) and streams the content to the terminal 70 (step 412). The user can passively view the content, or can interact with the content by selecting different viewing angles, can query certain information relating to the scene or the actors and actresses involved, or can interact with a commercial if desired (step 414). Each user operation is captured, along with the context of the operation, and the resulting data is used to update the context database for that user (step 414). The local server can adjust the content based on the new interaction (step 416) before looping back to step 410 to continue showing the requested content. The process thus provides customized content to the user, and allows the user to link, search, select, retrieve, initiate a subscription to and interact with information on the DVD as well as supplemental value-added information from a remote database, computer network or on-line server, e.g., a network server on the Internet or World Wide Web.

FIG. 5 illustrates a process 450 relating to content consumption within a browser/player. First, a user initiates playback of content (step 452). The browser/player then demultiplexes any multiplexed streams (step 454) and parses a BiFS elementary stream (step 456). The user then fulfill any necessary licensing requirements to gain access if content is protected, this could be ongoing in the event of new content acquisitions (step 458). Next, the browser/player invokes appropriate decoders (step 460) and begins playback of content (step 462). The browser/player continues to send contextual feedback to system (step 464), and the system updates user preferences and feedback into the database (step 466). The system captures transport operations such as fast forward and rewind, generate context information, as they are an aspect of how users interact with the title; for instance, what segments users tend to skip, and which users tend to watch repeatedly, are of interest to the system. In one embodiment, the system logs the user and stores the contextual feedback, applying any relative weights assigned in the Semantic Map, and utilizing the Semantic Relationships table for indirect assignments, an intermediate table should be employed for optimized resolution; the assignment of relative weights is reflected in the active user state information. Next, system sends new context information as available, such as new context menu items (step 468). The system may utilize rules-based logic, such as for sending customer focused advertisements, unless there are multiple windows, this would tend to occur during the remote content acquisition process (step 470). The system then handles requests for remote content (step 472).

After viewing the content, the user responds to any interactive selections that halt playback, such as with menu screens that lack a timeout and default action (step 474). If live streams are paused, the system performs time-shifting if possible (step 476). The user may activate context menu at anytime, and make an available selection (step 478). The selection may be subject to parental control specified in the configuration of the player or browser.

Figure 6A:
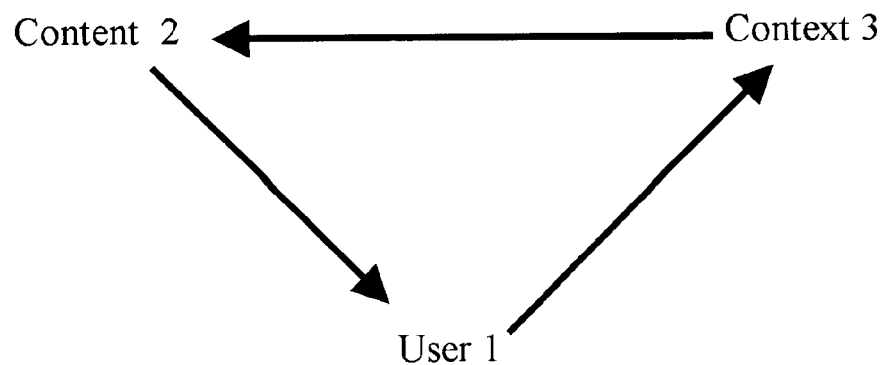
FIG. 6A shows an exemplary diagram showing the relationships among a user viewing content(s) in particular context(s).

FIG. 6A shows an exemplary diagram showing the relationships among a user 1 viewing content 2 in particular context(s) 3. The user 1 interacts with a viewing system through a user interface that can be a graphical user interface (GUI), a voice user interface (VUI), or a combination thereof Initially, the user 1 can simply request to see the content 2. The content 2 is streamed and played to the user. The user 1 can view the default stream, or can interact with the content 2 by selecting a different viewing angle, query for more information on a particular scene or actor/actress, for example. The user interest exhibited implicitly in his or her selection and request is captured as the context 3. The actions taken by the user 1 through the user interface is captured, and over time, the behavior of a particular user can be predicted based on the context 3. Thus, the user 1 can be presented with additional information associated with a particular program. For example, as the user 1 is browsing through the programs, he or she may wish to obtain more information relating to specific areas of interest or concerns associated with the show, such as the actors, actresses, other movies released during the same time period, or travel packages or promotions that may be available through primary, secondary or third party vendors. The captured context 3 is used to customize information to the viewer even with the multitude of programs broadcast every day. In addition, the system can rapidly update and provide the available information to viewers in real time. The combination of content 2 and context 3 is used to provide customized content, including advertising, to viewers.

Figure 6B:
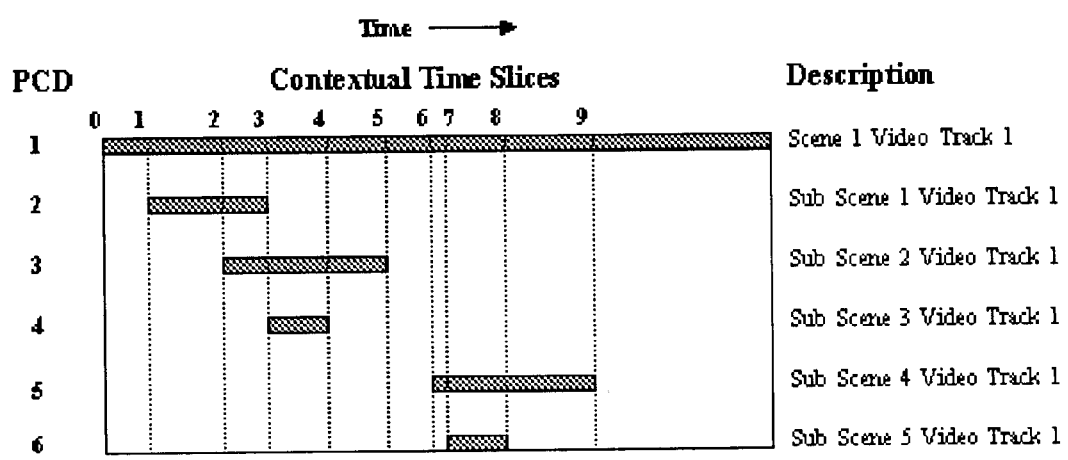
FIG. 6B shows an exemplary presentation.

FIG. 6B shows an exemplary presentation where a main presentation window is displayed along with a supplemental window running advertisements. In the following discussion, Presentation Context Descriptors (PCDs) designate the context embodied by a particular portion of monomedia content. Semantic descriptors (SDs) apply meanings to these PCDs, enabling various semantic properties of content to be distinguished. Semantic descriptors can from an acyclic relationship graph; the requisite relationships are mapped in the Semantic Relationships table. The relationships define a transitive equivalency flowing from specific to general, such that specific semantic instances also validate more general, inclusive semantics. The application of a semantic descriptor and a PCD occurs in a table called a semantic map, which furthermore supplies a nonzero weight less than or equal to one (default).

When a PCD becomes active, the SDs attributed to it are located via the semantic map. The score specified by the weight is added to the respective attribute subtotals located in a cumulative profile and session profile. For each attribute in question, transitive aggregation is applied for related SDs via the Semantic Relationship table, and applying the weight assigned to the relating attribute in the Semantic Map.

Turning now to FIG. 1B, the main presentation window is displayed along with a supplemental window running advertisements. The advertisements might be image-only banners while the main presentation is playing, but whenever it is paused, including when the presentation is halted pending user selection, a video or audio-video advertisement might run. For full screen mode, the window might temporarily split for these purposes.

At time 0, the viewer watches a basic audio-video clip. At this point, PCD 1 becomes valid, and the state change is communicated to the system. The following feedback process occurs:

The system locates attributes linked directly via the Semantic Map and indirectly via the Semantic Relationships table, and updates the aggregate scores located in the session and cumulative user state attributes. This value is part of the current context. Should the user pause presentation at this point, a commercial best fitting the current presentation context, the session context, or the user history could be selected via a comparison of attribute scores. In fact, any choice the user makes, the act will be logged along with the current context. Activation of context menu options, will yield contextual content options valid for the present context.

At time 1, the viewer continues to view the clip. PCD 2 becomes valid, while PCD 1 remains valid. The context state change for PCD 2 is sent to the system. The feedback process described at time 0 recurs.

At time 2, the viewer continues to view the clip. PCD 3 becomes valid, while PCDs 1 through 2 remain valid. The context state change for PCD 3 is passed to the system. The feedback process described at time 0 recurs.

At time 3, the viewer continues to view the clip. PCD 2 becomes invalid and PCD 4 becomes valid, while PCD 1 and 3 remain valid. The context state change for PCD 2 and 4 are sent to the system. The feedback process described at time 0 recurs.

At time 4, the viewer continues to view the clip. PCD 4 becomes invalid, while PCD 1 and 3 remain valid. The context state change for PCD 4 is communicated to the system. The feedback process described at time 0 recurs.

At time 5, the viewer continues to view the clip. PCD 3 becomes invalid, while PCD 1 remains valid. The context state change for PCD 3 is passed to the system. The feedback process described at time 0 recurs.

At time 6, the viewer continues to view the clip. PCD 5 becomes valid, while PCD 1 remains valid. The context state change for PCD 5 is passed to the system. The feedback process described at time 0 recurs.

At time 7, the viewer continues to view the clip. PCD 6 becomes valid, while PCD 1 and 5 remain valid. The context state change for PCD 6 is sent to the system. The feedback process described at time 0 recurs.

At time 8, the viewer continues to view the clip. PCD 6 becomes invalid, while PCD 1 and 5 remain valid. The context state change for PCD 6 is communicated to the system. The feedback process described at time 0 recurs.

At time 9, the viewer continues to view the clip. PCD 5 becomes invalid, while PCD 1 remains valid. The context state change for PCD 3 is passed to the system. The feedback process described at time 0 recurs.

In this example, multi-track streams, like multi-angle, were left out so as not to confuse the different notions of context. The semantics of interest here is context as metadata, not context as perspective. Context as perspective, of course, corresponds to alternate content, which has its own context. Context as metadata, corresponds more to content about the content, which perspective certainly qualifies for, but the notion of metadata is more encompassing, and shouldn't be limited by the context of perspective. In one embodiment, the system of FIGS. 1A and 1B can support DVD multi-angle and navigation in that the system can utilize behavioral analysis to customize the user's experience. By focusing on the more general case of metadata, a deeper understanding of the user's interest in certain contents or subsections thereof can be built.

Turning now to FIG. 7, a process 500 to enhance for user community participation is shown. A user may opt to participate in public viewing session, or opt out of such a session; this is useful for point-to-point presentations, for example (step 502). When opting for a public viewing session, other public users become visible, and may join into groups, resulting in synchronized sessions with one user designated as the pilot for navigation purposes (step 504). When part of a group, a communication window is made available so users may discuss the content (step 506). When part of a group and not the pilot, all content viewed is logged in passive mode, as the user is not responsible for interactive selections (step 508). The pilot can enter a white board mode, and draw on the presentation content; these drawings are made visible to the other group members (step 510). The user may opt to work in annotation mode, which is analogous to third party value-add information, in that users may leave commentary tied to particular sequences of the presentation, the visibility of such annotations may be public, or visible only to restricted access groups; an annotation window is utilized for these purposes, and is tied to the content the user is currently viewing (step 512). Upon having his or her annotations commented upon, the user may elect to receive email notifications (step 514).

Next, an exemplary sequence of interactions among the following participants is discussed:

AUTHOR (hence, the content provider)
AUTHORING SYSTEM
FABRIC (the ASP network, including servers, middleware, and switching mechanisms and infrastructure)
USER
GLUI (Graphical User Interface)
SUPPLEMENTAL CONTENT PROVIDER 1) The AUTHOR either downloads the AUTHORING SYSTEM from FABRIC, or obtains it from some install disc; in either case the complete runnable AUTHORING SYSTEM does not reside on the installed computer for security purposes
2) The AUTHOR installs and registers the AUTHORING SYSTEM with FABRIC; the AUTHOR SYSTEM knows how to query for ASP service providers, utilizing technologies such as Jini and/or LDAP; the USER may also manually enter the location of an ASP service provider for the AUTHOR SYSTEM to connect to
3) The AUTHOR registers with FABRIC, and logs into FABRIC to utilize the AUTHORING SYSTEM
4) The AUTHOR imports content streams into the AUTHORING SYSTEM
5) The AUTHOR associates codecs with the content streams
6) The AUTHOR applies presentation context descriptors (PCDs) to uniquely identify content segments; the PCDs may freely overlap; the PCDs designate contextually distinct segments of an elementary stream of varying length
7) The AUTHOR defines Contextual Object References and may relate them hierarchically
8) The AUTHOR freely attributes the defined CORs to PCDs and other CORs
9) The AUTHOR arranges the content streams into some layout, and defines navigational and sequential flow
10) The AUTHOR defines Context Menu Entries (CMEs) and associates them freely to CORs and PCDs
11) The AUTHOR specifies design time rules for flow customization by acquiring user input or usage statistics to affect branching and content acquisition
12) The AUTHOR tests the title via compilation and simulation; depending on the AUTHORING SYSTEM's licensing policy, various uses of AUTHORING SYSTEM functionality might incur just in-time code downloads and/or code fixing, as well as commerce transactions
13) The AUTHOR specifies the image destination of the title; even given specification of a static storage medium, the AUTHOR may specific that certain streams and stream segments reside remotely within FABRIC instead
14) The AUTHOR specifies access control options; these specifications may be general or granular (i.e. title, streams, and stream segments); the AUTHORING SYSTEM conveys this information in IPMP (Intellectual Property Management and Protection) elementary streams; access control may involve user permissions, such as for corporate and distance learning applications
15) The AUTHOR specifies and applies various copy protection options; these specifications may be general and/or granular (i.e. title, streams, and stream segments); copy protection options are selected from FABRIC, and are available based on authentication and authorization from FABRIC on a permissions basis, wherein the AUTHOR will have access to some methods but not all
16) The AUTHOR may define and register new copy protection options with FABRIC, indicating the accessibility scope and any commercial implications
17) The AUTHOR specifies commercial constraints with FABRIC, resulting in the generation of pricing models with FABRIC; these pricing models are articulated with the XML grammar for pricing, and are stored within FABRIC
18) The AUTHOR may simulate effects of pricing, utilizing the FABRIC database 19) The AUTHOR applies commercial constraints; these specifications may be general and/or granular (i.e. title, streams, and stream segments)
20) The AUTHOR generates the final output image, which includes registration with FABRIC; at this point, streams might be transferred to FABRIC for remote streaming; this registration involves stream and title information being transmitted to FABRIC; this registration includes PCD, COR and CME specifications being transmitted to FABRIC; this registration includes codec information being transmitted to FABRIC; this registration includes access control information being transmitted to FABRIC
21) The USER acquires the GLUI, whether downloaded from FABRIC, obtained from an installation disc, or already residing on the USER's device
22) At first use, the USER registers the GLUI with FABRIC; this is important, because FABRIC must understand the performance constraints of deployed GLUIs
23) At first login request to the GLUI, the USER must register with FABRIC; this can include financial information for commercial transactions and billing, or this financial information might be supplied on demand at a later time
24) The USER may create user profiles, such as to accommodate various family members
25) The USER may subscribe to title information based on content attributes they are interested in
26) The USER may opt for remote storage within FABRIC, including security specifications
27) The USER acquires content, whether downloaded from FABRIC or played from a content storage medium
28) The USER may opt to view content offline if the particular title allows this
29) For offline viewing, the GLUI may accumulate usage statistics within a hollow region of its install image; this may enable content flow customization to take place in an offline session; the GLUI may later update FABRIC with this information at a later time
30) The USER may log into FABRIC, which involves authentication, authorization and access logging
31) FABRIC may inform the USER of updated GLUI components available on the server
32) FABRIC may provide the USER with information they have subscribed for; this may might be conveyed via email
33) The USER accesses content within the GLUI, which might pertain to audio-visual content, information, ASP application streams, or similar types of content.
34) The GLUI may receive new PCDs, CORs, and CMEs from FABRIC, whether from the AUTHOR or a SUPPLEMENTAL CONTENT PROVIDER
35) The GLUI reacts to the presence of access control information; this may require the user to begin an online session in certain cases
36) The GLUI provides the user with commerce constraint information in conjunction with FABRIC
37) The GLUI communicates PCDs state changes; these may indirectly provide commercial feedback
38) The GLUI may request new content streams on behalf of the USER, such as identified via CMEs; during content acquisition, the GLUI will display any specified transitional content as stream acquisition proceeds; the GLUI will communicate with FABRIC for advertising specification; this may involve advertising selection parameters, in which case an advertisement stored along with the content may be selected and displayed, while updating FABRIC with the PCD state changes pertaining to the advertisement; the GLUI may sometimes download advertisements, whether during stream acquisition or in anticipation of it.
39) User interactivity is described by PCDs; when a user selects different viewing options, this activates and deactivates respective PCDs; when a USER requests remote streams (such as via CME or explicit content links), this corresponds to this activating and deactivating PCDs; CORs are inevitably associated to PCDs, whether directly, or by virtue of other CORs, so the GLUI does not need to communicate their state changes to FABRIC; however, the utilization of CORs for navigation purposes, might be communicated to FABRIC.
40) The USER may interact with CORs to achieve context-based seeking, such as to navigate all the scenes with a particular combination of actors, subject matters and objects.
41) The USER may interact with content representing the GUI of an ASP application. Here, the GUI elements correspond to unique identifiers (PCDs) to be conveyed along with event-specific context as part of an event model to the operating system. Basically, the operating system must know what GUI element in what context is being interacted with. This information comprises a message sent to a remote application, unless a local application proxy has registered to handle the particular event.
42) In the event that the GLUI is serving as the OS GUI, the OS drawing routines are rendered using the GLUI's OS API so that dynamic, visual and audio-visual elementary streams can be generated. For instance, when a system message needs to be displayed, the message text along with the audio-visual scene object to accompany it with are passed from the OS to the GLUI via the API. The GLUI then dynamic generates the stream along with the necessary BiFS commands to alter the scene.
43) When the USER conducts a commercial transaction via the GLUI, the GLUI communicates with FABRIC to create and store the requisite transaction. FABRIC communicates when an underlying payment and fulfillment system, if applicable.
44) The USER may interact with FABRIC via the GLUI to visualize pricing scenarios and implications. The USER may establish billing constraints to manage their ASP expenditures.
45) As the USER interacts with a title over time, FABRIC accumulates weighted scoring of PCDs and CORs, with which it can make calculated determinations, such as what content or value-add streams to offer, and when. Furthermore, the AUTHOR and SUPPLEMENTAL CONTENT PROVIDER can utilize this data to improve their services.
46) Once a title has been registered with FABRIC, SUPPLEMENTAL CONTENT PROVIDERs may associate new content, such as audio-visual streams or information, to the title's PCDs and CORs by utilizing the AUTHORING SYSTEM. This access may or may not correspond to commercial licensing, and may or may not correspond to access permissions to access the PCDs and CORs.
47) In associating new content to an existing title, the AUTHOR or SUPPLEMENTAL CONTENT PROVIDER may find it necessary to create new PCDs or CORs. Access control, commercial constraints, and copy protection are articulated with the new authoring of the content. The content creation process is identical to the process for authoring standalone content, except that content streams are associated to external titles and reside within FABRIC.

48) The USER can subscribe to SUPPLEMENTAL CONTENT PROVIDER offerings, via the GLUI, which works in conjunction with FABRIC to negotiate licensing constraints. This content generally, but not necessarily, remains within FABRIC to be streamed on demand to the USER.

49) The USER can take part in community-based functionality. This functionality is enabled by databases and directories within FABRIC to create an annotation server, as well as by an annotation module which may be distinct of integrated within the GLUI. Under this community-based functionality, USERs can find other online USERs, such as those viewing the same content. This community participation can include public and private viewing sessions wherein a designated pilot USER may drive a synchronized viewing experience, including whiteboard interactivity. This community participation may involve the public or private posting of annotations, as well as the reception of public and private USER-provided annotations attributed to particular titles. Thus, as the appropriate segments of the title become active, the related annotations become visible.

| Fabric | Authoring System | UI |
|---|---|---|
| content delivery | content development | content presentation |
| evaluation of access control | specification of access control mechanisms | enforcement of access control mechanisms |
| notification & delivery of associated content | dynamic association of content | indication of available associated content |
| notification of commercial constraints | specification of commerce constraints | indication and interaction with commerce model |
| correlation of PCDs | creation of PCDs | notification of PCD state changes |
| correlation of CORs | creation and interrelation CORs | utilization of CORs |
| deliver new CMEs; deliver & log content requests from context menus | create & attribute CMEs to PCDs & CORs | display context menus on demand & transmit choices |
| deliver remote BiFS streams | generate BiFS stream | parse BiFS stream |
| deliver necessary codecs or codec updates, correlating them via registered streams and codecs in the database | associate codecs | resolve codecs; utilize Fabric to acquire missing or updated codecs |

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An intelligent switch for routing data through a network fabric in accordance with a requested quality of service (QoS), comprising:
   a processor;
   a network interface coupled to the processor and the network fabric;
   means for predicting load and redistributing traffic to deliver the data at the requested QoS; and
   wherein the network fabric comprises one or more POPs and a gateway hub, wherein each POP send its current load status and QOS configuration to the gateway hub where predictive analysis is performed to handle load balancing of data streams to deliver consistent QoS for the entire network on the fly.

2. The intelligent switch of claim 1, wherein predictive analysis is used to configure the fabric to deliver QoS.

3. An intelligent switch for routing data through a network fabric in accordance with a requested quality of service (QoS), comprising:
   a processor;
   a network interface coupled to the processor and the network fabric; and
   means for predicting load and redistributing traffic to deliver the data at the requested QoS wherein the predicting means periodically takes snapshots of traffic and processor usage and correlates the traffic and usage data with previously archived data for usage patterns that are used to predict the configuration of the network to provide optimum QoS.

4. The intelligent switch of claim 1, wherein the network fabric streams MPEG (Moving Picture Experts Group) elementary streams (ES), including Binary Format for Scenes (BIFS) data and Delivery Multimedia Integration Framework (DMIF) data.

5. The intelligent switch of claim 4, wherein the BiFS data contains the DMIF data to determine the configuration of content.

6. The intelligent switch of claim 4, wherein DMIF and BiFS information determine the capabilities of a device accessing a channel.

7. The intelligent switch of claim 4, wherein the data content defines the configuration of the network once its BiFS Layer is parsed and checked against the available DMIF Configuration and network status.

8. The intelligent switch of claim 1, wherein the predicting means parses one or more ODs and one or more BiFSs to regulate elements being passed to the multiplexer.

9. The intelligent switch of claim 4, wherein a BiFS comprises interaction rules.

10. The intelligent switch of claim 1, wherein one or more rules are used to query a field in a database and wherein a field can contain scripts that execute one or more If/Then statements.

11. The intelligent switch of claim 1, wherein one or more rules customize a particular object in a given scene.

12. The intelligent switch of claim 1, wherein the network fabric includes an Asynchronous Transfer Mode (ATM) and a telephone network.

13. The intelligent switch of claim 1, wherein the data is media content.

14. The intelligent switch of claim 1, wherein the data represents a graphical user interface (GUI).

15. The intelligent switch of claim 1, wherein the GUI is generated by a remote server and broadcasted to one or more devices over the fabric.

16. A system, comprising:
   a network fabric;
   an intelligent switch for routing data through a network fabric in accordance with a requested quality of service (QoS), comprising:
      a processor;
      a network interface coupled to the processor and the network fabric; and
      means for predicting load and redistributing traffic to deliver the data at the requested QoS;

one or more clients coupled to the intelligent switch, wherein the network fabric comprises one or more POPs and gateway hub, wherein each POP send its current load status and QOS configuration to the gateway hub where predictive analysis is performed to handle load balancing of data streams to deliver consistent QoS for the entire network on the fly.

17. The system of claim 16, wherein predictive analysis is used to configure the fabric to deliver QoS.

18. The system of claim 16, wherein DMIF and BiFS information determine the capabilities of a device accessing a channel.

19. The system of claim 16, wherein the device receives data representative of media content or a graphical user interface (GUI) generated by a remote server and broadcasted to one or more devices over the fabric.

* * * * *